March 3, 1964     M. A. SMITH, JR     3,123,054

WATER HEATER

Filed Aug. 7, 1961

INVENTOR.
Melvin A. Smith, Jr.
BY

ATTORNEY

United States Patent Office 3,123,054
Patented Mar. 3, 1964

3,123,054
WATER HEATER
Melvin A. Smith, Jr., 683 Blake Ave. SE., Atlanta 16, Ga.
Filed Aug. 7, 1961, Ser. No. 129,855
4 Claims. (Cl. 122—135)

This invention relates to furnaces, and is more particularly concerned with a water heater.

In the past, a variety of water heaters have been devised wherein heat generated by the combustion of fuel is transferred via a common wall to the water retained within a confined area. These water heaters, if they approach a high efficiency, are bulky, relatively complicated and expensive. Many such devices have a plurality of small passageways, either fire tubes or water tubes, on which scale accumulates with continued use. The less complicated devices are usually quite inefficient in operation, discharging most of their heat to the atmosphere, and function to heat the ambient air as well as the water which they are intended to heat. Such inexpensive devices usually have low, unevenly heated heat transfer areas.

In an attempt to obviate the disadvantages described above, I have devised a hot water heater which includes a pair of casings, one within the other. The inner casing is supported in cantilever fashion within the outer chamber and defines a combustion chamber from which a T-shaped flue leads to the exterior. The inner and outer casings have a common wall along one side, through which access may be had to the combustion chamber. In the construction here presented, water to be heated is passed between the inner and outer casings and the walls of the casings are arcuate, each wall of the outer casing having a convex outer surface and a concaved inner surface, and each wall of the inner casing having a concaved outer surface and a convex inner surface. By such an arrangement, the water to be heated is passed on five sides of the combustion chamber, around the main exhaust ducts and around each of the branch exhaust ducts of the flue.

Accordingly, it is an object of the present invention to provide a compact water heater having maximum heat transfer areas.

Another object of the present invention is to provide a water heater which is inexpensive to manufacture, durable in structure, and efficient in operation.

Another object of the present invention is to provide a water heater having sufficiently large heat transfer areas that the accumulation of scale within the water chamber will not appreciably impede the flow of the water therethrough.

Another object of the present invention is to provide a water heater which may be quickly and easily installed in or removed from a small or confined area.

Another object of the present invention is to provide a water heater having a combustion chamber which may be readily and easily cleaned and a flue which may be readily and easily cleaned.

Other objects, features and advantages of the present invention will become apparent from the following description when taken in conjunction with the accompanying drawings wherein like characters of reference designate corresponding parts throughout the several views and wherein.

Figure 1:
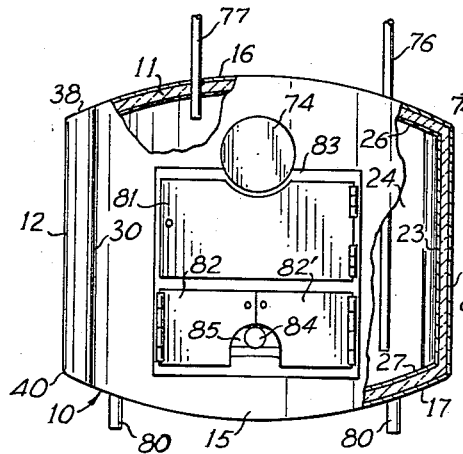
FIG. 1 is a front elevational view partially broken away of a water heater constructed in accordance with the present invention.

Referring now in detail to the embodiment chosen for the purpose of illustrating the present invention, it being understood that in its broader aspects the present invention is not limited to the exact details herein depicted, numeral 10 denotes generally the outer casing of the water heater of the present invention. This outer casing 10 includes congruent inner and outer walls separated by insulating material 11. In more detail, the outer casing 10 includes outer side walls 12 and 13, an outer back wall 14, an outer front wall 15, an outer top wall 16 and an outer bottom wall 17 joined by their edges to provide a box-shaped member.

Each of the aforesaid walls has a convex outer surface and a concaved inner surface being respectively arcuate about a single axis, and each having the same length radius of curvature, the axes in each instance falling outside of the confines of the outer casing 10. The side walls 12 and 13, the back wall 14 and the front wall 15 are each concaved about vertical axes, the axes of the side walls 12 and 13 being in a vertical transverse center plane, and the axes of the front and back walls 14 and 15 being in a vertical longitudinal center plane. On the other hand, the top and bottom walls 16 and 17 are convex about parallel horizontal axes disposed along the vertical longitudinal center plane and normal to the aforesaid axes.

It is now seen that the outer casing 10, while being somewhat box-shaped, approaches the shape of a sphere. The inner lining or casing includes inner side walls 22 and 23, inner back wall 24, inner front wall 25, inner top wall 26 and inner bottom wall 27, all constructed in a manner similar to the construction of their respective outer walls, the inner walls being slightly smaller than their counterparts to provide for the insulation 11 between the inner and outer walls.

For the purpose of having all outer walls meet along common edges, the side walls 12 and 13 have straight, vertical, front and rear edges 30, 31 and 32, 33, the front edges 30 and 31 forming a common seam with the vertical side edges of the front wall 15 and the rear edges 32 and 33 forming a common seam with the vertical side edges of the rear wall 14.

With the construction thus far described, it will be understood that the upper and lower edges 34 and 35 of the front wall 15 must be convex to conform to the convex curvature of the front and rear edges of top and bottom walls 16 and 17. For a like reason, the upper and lower edges 36 and 37 of the back wall 14 are convex. The upper and lower edges 38, 39 and 40, 41 should be concaved to abut the convex side edges of the top and bottom walls 16 and 17. All abutting edges are welded together, the inner walls having complementary edges which are also joined by welding.

The inner casing, denoted generally by numeral 50, is preferably of single thickness, sheet metal construction to provide for rapid heat transfer. In more detail, the walls of inner casing 50 are of oppositely bowed construction including side walls 52 and 53, back wall 54, top wall 55 and bottom wall 56, all respectively provided with concaved outer surfaces and convex inner surfaces and all spaced from the walls of the outer casing. Side walls 52 and 53 are curved about longitudinal axes lying parallel and in a horizontal plane while top wall 55 and bottom wall 56 are curved about parallel axes lying in the vertical longitudinal center plane. The upper and lower edges 57, 58 and 59, 60 of side walls 52 and 53 are straight and parallel to one another and abut the side edges of the top and bottom walls 55 and 56, the abutting edges being welded together. The back wall 54 has all concaved edges which conform to and join the rear or inner edges of the side walls 52, 53, top wall 55 and bottom wall 56. Thus, it is seen that I have provided a box-shaped member or casing 50 which is open at one end.

Figure 2:
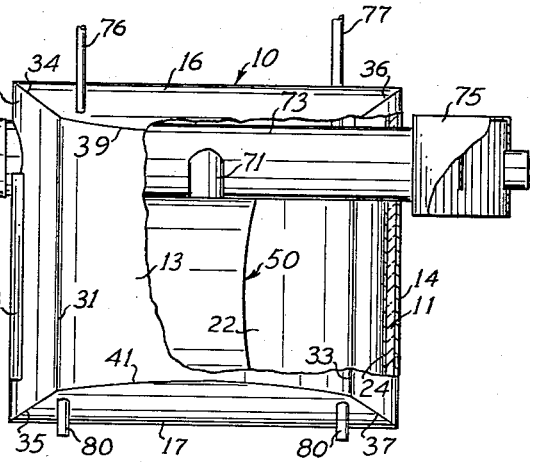
FIG. 2 is a side elevational view of the water heater shown in FIG. 1.
Figure 3:
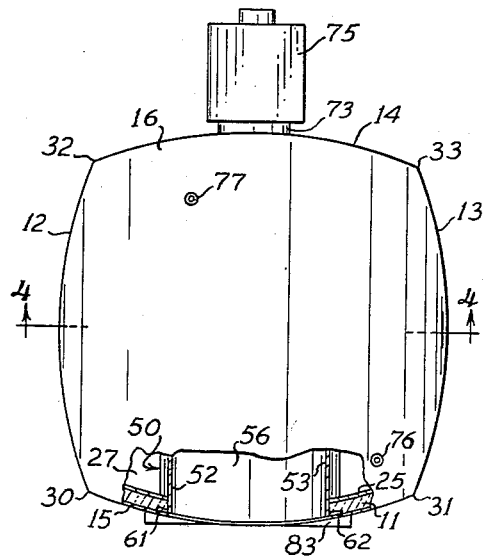
FIG. 3 is a partially broken top view of the water heater shown in FIGS. 1 and 2.
Figure 4:
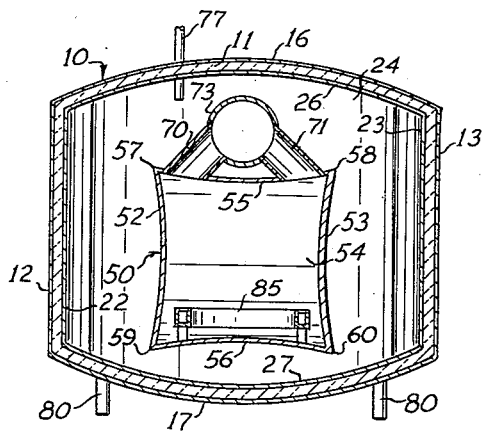
FIG. 4 is a cross sectional view taken along line 4—4 in FIG. 3.

The casing 50 is received through an appropriate opening in the front walls 15 and 25 of outer casing 10, the casing 50 being preferably secured by outwardly turned flanges, such as flanges 61 and 62 which are welded to the inner surface of the front outer wall 15 adjacent the edges of the opening of wall 15. It will be observed in FIGS. 2 and 4 that the inner casing 50, which projects inwardly within the outer casing 10, is closer to the bottom wall 27 than the top wall 26.

A pair of transversely aligned converging flue pipes or main exhaust ducts 70 and 71 extend, in an upwardly and inwardly direction, from top wall 55 of casing 50, the flue pipes 70 and 71 leading from positions intermediate the transverse center line and inner edge of the top wall 55 and respectively adjacent side walls 52 and 53.

The upper ends of flue pipes 70 and 71 intersect the central portion of a longitudinal, horizontal flue pipe 73 to provide communication between the combustion chamber of casing 50 and pipe 73. The pipe 73 protrudes outwardly in opposite directions from the flue pipes 70 and 71 to provide branch exhaust ducts, the ends of which extend respectively through opposed sides of the outer casing 10, i.e., through the front and rear walls 15, 25 and 14, 24 whereby either end of the flue pipe 73 may be selectively connected to a smoke stack (not shown) or other vent means. In the present embodiment, however, the front end of pipe 73 is closed by means of a removable cap 74 while the rear end of pipe 73 is provided with a conventional baffle member 75 which is adapted to be connected to any vent means. It will be understood that cap 74 may be installed on the rear end of pipe 73 and the baffle member 75 installed on the front end of pipe 73, if desired.

With the apparatus thus far described, it will be understood that the space between the outer casing 10 and the inner casing 50 forms a closed water chamber with the water contacting five sides of the casing 50, i.e. with the water contacting side walls 52 and 53, back wall 54, top wall 55 and bottom wall 56, as well as surrounding the outer surfaces of the flue pipes 70, 71 and 73 throughout substantially the entire lengths of these pipes. This provides for substantially maximum heat transfer area in contact with the water so that the water tends to maintain the temperature of these parts at close to the temperature of the water.

The apparatus herein described is supported on legs 80 which depend from bottom wall 17 as shown in the drawings. The apparatus also includes an access door or upper and lower access doors 81 and 82, 82' which are hingedly secured to a door carrying frame 83 mounted on front wall 15 whereby access may be had to the combustion chamber. The opposed lower access doors 82, 82' have at their outer abutting edges complementary cut away portions to provide room for the gas pipe 84 which leads to a burner 85 mounted on bottom wall 56 within the combustion chamber. The burner preferably employs natural gas as a source of fuel; however, other hydrocarbon liquid, gaseous or pulverized solid fuel burners may be substituted for burner 85, if desired, as will be understood by those skilled in the art.

The entrance and exit water pipes 76 and 77, respectively, pass through the outer casing 10, e.g. through top walls 16 and 26 and into the water chamber between the inner casing 50 and outer casing 10, the entrance or feed water pipe 76 terminating in an open end adjacent bottom wall 27 and edge 31 at the front corner portion of the apparatus, and the exit or discharge pipe 77 terminating in an open end adjacent top wall 26 in a somewhat diametrically opposed position with respect to the end of pipe 76. Preferably, the pipe 77 is above the top wall 55 so as to collect the hottest water and create a circulation, in conjunction with the discharge of pipe 76, of the cold water passing around the bottom wall 56 and upwardly along the side walls 52 and 53 and via the flue pipes 70, 71 and 73. With the heat being more concentrated at the top wall 55 and in the flue pipes 70, 71 and 73, the water is heated to a higher temperature than with say the usual counter flow action between the flue gases and the water, while at the same time reducing the thermal shock on the metal parts. By such an arrangement, inexpensive, thin metal parts may be used.

The convex arrangement of the walls of the outer casing 10 and the concaved construction of the walls of the inner casing 50 as disclosed herein reduces the thickness required of the various plates or walls which define the water chamber since each such wall is curved in the direction in which the water pressure tends to deform such wall. It will also be understood that the curvature of side walls 52 and 53 and back wall 54 tend to impart an upward and outward circulatory motion to the water in the water chamber, due to the heating thereof. This circulatory movement of the water is aided by the curvature of walls 22, 23 and 24 of the outer casing 10. Also, the cantilever structure of the inner casing 50 permits the casing 50 to expand and contract in response to temperature differentials.

It will be obvious to those skilled in the art that many variations may be made in the embodiments chosen for the purpose of illustrating the present invention without departing from the scope thereof as defined in the appended claims.

I claim:

1. A water heater comprising an outer casing having opposed walls, an inner casing having opposed walls within said outer casing, said inner and outer casings defining therebetween a water chamber, water pipes passing through said outer casing and communicating with said water chamber for creating a circulation of water through said water chamber, said outer casing having an opening through one wall thereof, said inner casing being provided with an open end communicating with said opening through said one wall, said inner casing being connected to said one wall by its edge portions which are adjacent said open end, said wall of said outer casing supporting said inner casing in cantilever fashion with the bottom of said inner casing spaced from an overlying the bottom of said outer casing, said inner casing defining a combustion chamber, a flue passing through said outer casing and said water chamber communicating with said combustion chamber and a burner within said combustion chamber for burning fuel and heating said inner casing and said flue, the opposed walls of said outer casing being convex, the opposed walls of said inner casing being concaved and facing the opposed walls of said outer casing.

2. A water heater comprising an outer casing having a plurality of opposed walls, an inner casing having a plurality of opposed walls and within said outer casing, said inner and outer casings defining therebetween a water chamber, water pipes passing through said outer casing and communicating with said water chamber for creating a circulation of water through said water chamber, said inner casing defining a combustion chamber, a flue communicating with said combustion chamber, and a burner within said combustion chamber for burning fuel and heating said inner casing, said walls of said outer casing being convex, said walls of said inner casing being concaved and respectively opposite the opposed walls of said outer casing.

3. A water heater comprising an outer casing having opposed side walls, opposed front walls and back wall, and opposed top wall and bottom wall, an inner casing having side walls, a front wall, a back wall, a top wall and a bottom wall within said outer casing, said inner and outer casings defining therebetween a water chamber, water pipes passing through said outer casing and communicating with said water chamber for creating a circulation of water therein, said outer casing having an opening through one wall thereof, said inner casing being provided with an open end communicating with said opening through said one wall, said inner casing being connected to said one wall by its edge portions which are adjacent said open end, said wall of said outer casing supporting said inner casing in cantilever fashion with the bottom wall of said inner casing spaced from and overlying the bottom wall of said outer casing, said inner casing defining a combustion chamber, a flue passing through said outer casing and said water chamber communicating with said combustion chamber, a burner within said combustion chamber for burning fuel and heating said inner casing and said flue, the walls of said outer casing each being convex, the walls of said inner casing each being concaved, the side walls and front wall and back wall of said outer casing having vertical parallel axes of curvature, the top and bottom walls of said outer casing having horizontal parallel axes of curvature, the side walls and top wall and bottom wall of said inner casing having longitudinal parallel axes of curvature, the back wall of said inner casing having a horizontal transverse axis, said flue including main flue pipe means extending upwardly through said water chamber and a horizontal flue pipe connected to said main flue pipe means intermediate the ends of said horizontal flue pipe, said ends protruding through opposed walls of said outer casing, and a door hingedly connected to said outer casings for closing said opening.

4. A water heater comprising a horizontally disposed outer casing having opposed walls, an inner casing having opposed walls within said outer casing, said inner and outer casings defining therebetween a water chamber, said outer casing having an opening through one wall thereof, said inner casing being provided with an open end communicating with said opening through said one wall, said inner casing being connected to said one wall by its edge portions which are adjacent said open end, said wall of said outer casing supporting said inner casing in cantilever fashion with the bottom wall of said inner casing spaced from and overlying the bottom wall of said outer casing, water pipes passing through said outer casing and communicating with said water chamber, the outlet and inlet of said pipes being respectively diagonally disposed in said chamber for creating a circulation of water through said water chamber from the bottom one end of said chamber to the top other end of said chamber, said inner casing defining a combustion chamber, a flue passing through said outer casing and said water chamber and communicating with said combustion chamber, and a burner within said combustion chamber for burning fuel and heating said inner casing and said flue, the opposed walls of said outer casing being convex, the opposed walls of said inner casing being concave and respectively opposite the opposed walls of said outer casing, the axis of curvature of the opposed walls of said inner casing being disposed horizontally, the opposed walls being disposed so as to impart an outward movement to water within said water chamber when said water is adjacent the walls of said inner casing and said water is heated to impart upward movement thereof.

References Cited in the file of this patent
UNITED STATES PATENTS

| | | |
|---|---|---|
| 159,103 | Latta | Jan. 26, 1875 |
| 411,525 | Kloeppinger | Sept. 24, 1889 |
| 1,632,888 | Davis | June 21, 1927 |
| 1,751,534 | Taylor | Mar. 25, 1930 |
| 2,084,990 | Burghardt | June 29, 1937 |
| 2,477,831 | Schmitz | Aug. 2, 1949 |
| 2,888,911 | Thompson | June 2, 1959 |

FOREIGN PATENTS

| | | |
|---|---|---|
| 48,402 | Switzerland | Aug. 9, 1909 |
| 75,707 | France | Mar. 23, 1867 |
| 304,428 | Germany | June 29, 1916 |